(12) United States Patent
Mendis et al.

(10) Patent No.: US 9,094,677 B1
(45) Date of Patent: Jul. 28, 2015

(54) HEAD MOUNTED DISPLAY DEVICE WITH AUTOMATED POSITIONING

(71) Applicant: Google Inc., Mountain View, CA (US)

(72) Inventors: Indika Charles Mendis, Mountain View, CA (US); Steven John Lee, San Francisco, CA (US)

(73) Assignee: Google Inc., Mountain View, CA (US)

( * ) Notice: Subject to any disclaimer, the term of this patent is extended or adjusted under 35 U.S.C. 154(b) by 180 days.

(21) Appl. No.: 13/951,086

(22) Filed: Jul. 25, 2013

(51) Int. Cl.
*H04N 13/04* (2006.01)
*G02B 27/01* (2006.01)

(52) U.S. Cl.
CPC .... *H04N 13/0429* (2013.01); *G02B 2027/0178* (2013.01)

(58) Field of Classification Search
CPC ..................... G02B 27/017; G02B 2027/0178; G06F 3/013; H04N 13/0475; H04N 13/044; H04N 13/0477; H04N 13/0481; H04N 13/0484; H04N 5/7491
See application file for complete search history.

(56) References Cited

U.S. PATENT DOCUMENTS

| | | | |
|---|---|---|---|
| 4,109,145 A | | 8/1978 | Graf |
| 4,439,755 A | * | 3/1984 | LaRussa ....................... 340/980 |
| 5,506,595 A | | 4/1996 | Fukano et al. |
| 5,689,619 A | | 11/1997 | Smyth |
| 5,739,797 A | | 4/1998 | Karasawa et al. |
| 6,909,408 B2 | | 6/2005 | Matko et al. |
| 7,542,210 B2 | | 6/2009 | Chirieleison, Sr. |
| 8,032,264 B2 | | 10/2011 | Breed |
| 8,185,845 B2 | | 5/2012 | Bjorklund et al. |
| 2005/0219152 A1 | | 10/2005 | Budd et al. |
| 2012/0139817 A1 | | 6/2012 | Freeman |
| 2012/0188148 A1 | * | 7/2012 | DeJong ............................ 345/8 |

FOREIGN PATENT DOCUMENTS

EP      716329 B1      8/2003

\* cited by examiner

*Primary Examiner* — Gerald Johnson
(74) *Attorney, Agent, or Firm* — Lerner, David, Littenberg, Krumholz & Mentlik, LLP

(57) ABSTRACT

A head mountable display that has an automatic positioning mechanism configured to move a display toward a user's resting line of sight when it detects the user is engaging the display. Engagement is detected by comparing the instantaneous eye orientation with the instantaneous display position to see if they are aligned. Upon detecting user engagement, the device may delay a predetermined amount of time prior to moving the display.

23 Claims, 11 Drawing Sheets

HEAD MOUNTED DISPLAY DEVICE WITH AUTOMATED POSITIONING

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive. The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays", "head-mounted displays," "head-mounted devices," or "head-mountable devices." A head-mountable device ("HMD") places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible. Other personal image displays can be what is referred to as a heads-up display, wherein the image is displayed on, in, or through a transparent display that superimpose the displayed image over a view of the surrounding environment. These allow the user to view the image presented by the display simultaneously with their surroundings. Such devices, however, can have many limitations, including in their fit and comfort to their wearers as well as limited functionality.

Both head-mounted and heads-up displays can be connected to a video source that receives a video signal that the device can read and convert into the image that they present to the user. The video source can be received from a portable device such as a video player, a portable media player or computers. Some such display devices are also configured to receive sound signals, which are delivered to the user typically through incorporated headphones. The functionality of these types of displays is, however, limited to passive actions wherein the display simply receives information from an external source and presents it to the wearer in limited forms.

The positioning of the display in an HMD may vary depending on the individual wearer's preferences, the type of content being displayed, the conditions of use, or combinations of these and other factors. For example, some may prefer to have content that is intended to be viewed over a short period of time presented on a display that is positioned to not interfere with other activities. In another example, a display that is positioned to be out of the way can be uncomfortable for the user to focus on for longer periods of time needed to view other types of content. Such discomfort may be due to eye strain or positioning of the eye that results in a break between the lens of the eye and the eyelid.

BRIEF SUMMARY

The present disclosure describes a head mountable display device capable of moving its display between a number of different positions that can be suited for the viewing of different types of images and/or information under different conditions of use. The head mountable display may be able to complete such movement automatically and can do so upon a determination of the need or suitability of such movement.

An aspect of the present disclosure relates to a head mountable display having a display unit configured to present information to a user via a display. The head mountable display has a mount configured to be worn on a user's head with the display positionable adjacent the user's eye. The head mountable display also has a positioning mechanism configured to move the display relative to the mount. An eye tracking unit is configured to obtain an image of the eye and communicate with the processor. The processor can determine if the instantaneous display position and the instantaneous eye position are aligned and cause the positioning mechanism to move the display toward an engaged viewing position. The processor can also cause the positioning mechanism to move the display toward an original viewing position during a period when the instantaneous eye orientation is no longer aligned with the instantaneous display position.

Another aspect of the present disclosure relates to a head mountable display that varies the speed at which the display is moved. For example, while the display moves toward the ocular resting gaze it may travel very slowly such that the movement is almost imperceptible to the user yet on the return trip the display may move much faster. Some embodiments can be configured so that the display remains at a constant distance from the eye while it is moved.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable display (HMD), which may also be referred to as a head-mounted device.

An example system may also be implemented in or take the form of other devices, such as a mobile phone, among other possibilities. Further, an example system may take the form of non-transitory computer readable medium, which has program instructions stored thereon that are executable by a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 1A:
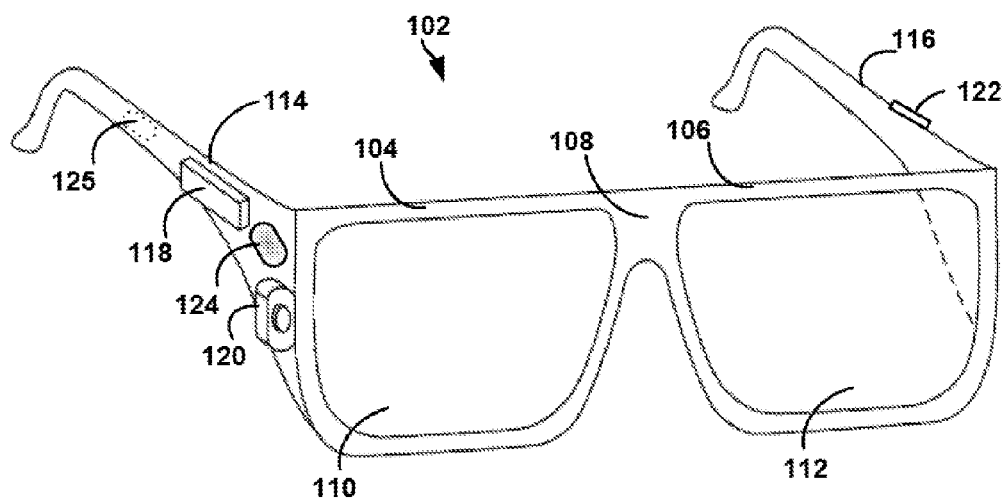
FIG. 1A illustrates a wearable computing system according to an example embodiment.

FIG. 1A illustrates a wearable computing system according to an example embodiment. In FIG. 1A, the wearable computing system takes the form of a head-mountable device (HMD) 102. However, example systems and devices may take the form of or be implemented within or in association with other types of devices. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 122 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

Figure 1B:
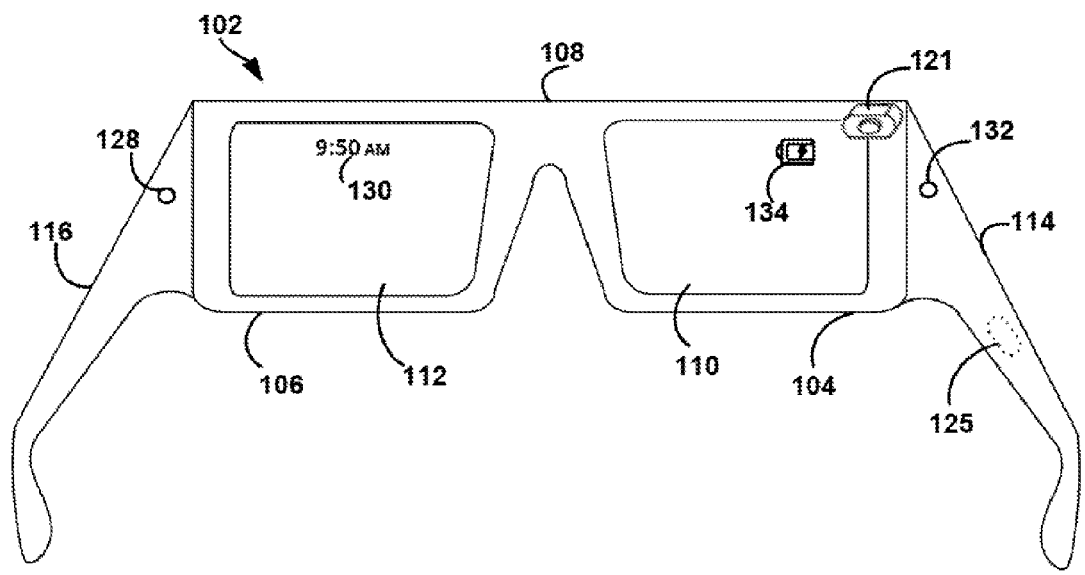
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

As such, certain eye movements may be mapped to certain actions. For example, certain actions may be defined as corresponding to movement of the eye in a certain direction, a blink, and/or a wink, among other possibilities.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

Figure 1C:
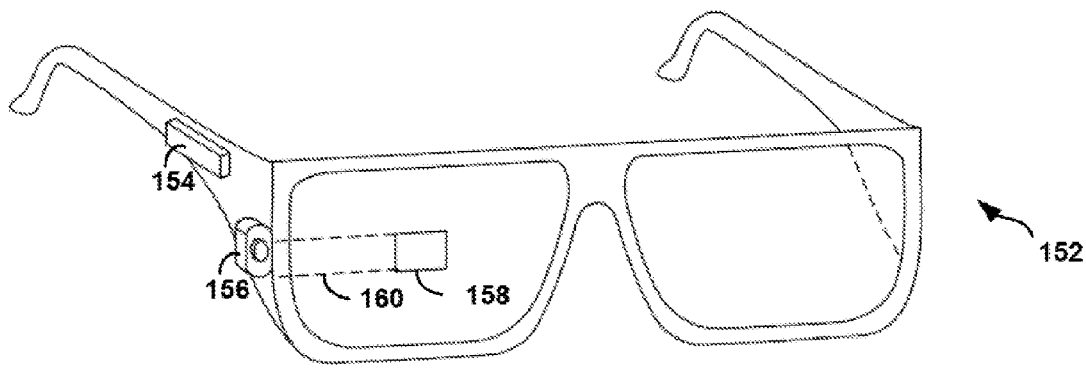
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
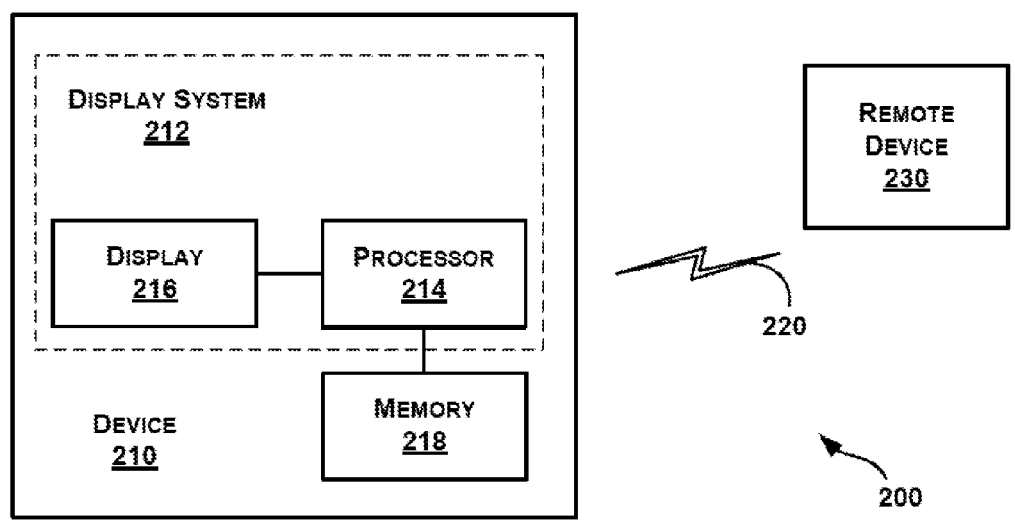
FIG. 1D illustrates another wearable computing system according to an example embodiment.

FIG. 1D shows system 200 illustrated within a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1C or in FIG. 2-10.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 1D, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2:
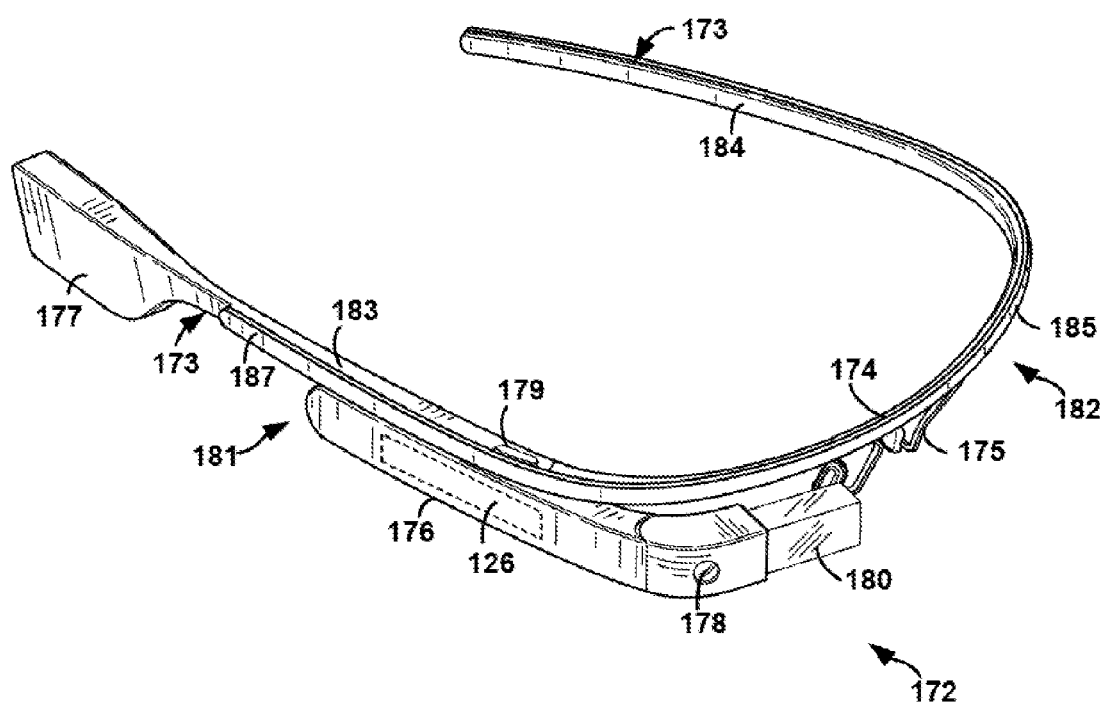
FIGS. 2 and 3 show a wearable computer device according to an embodiment of the disclosure.
Figure 3:
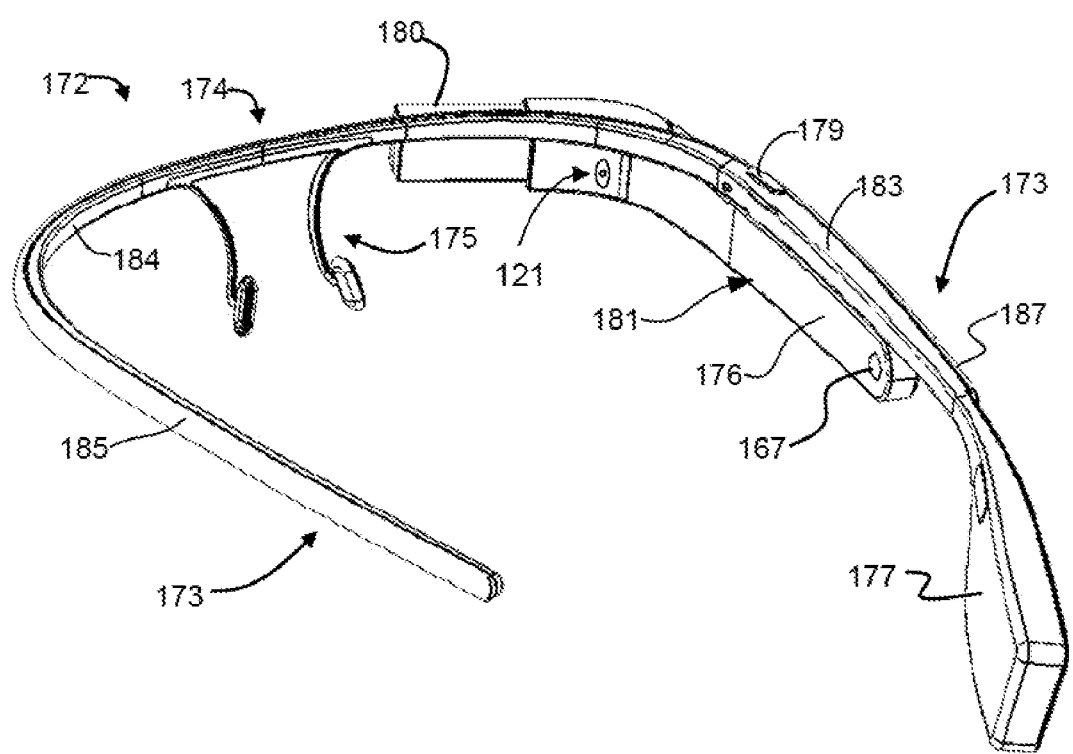

FIGS. 2 and 3 illustrate another wearable computing system according to an example embodiment, which takes the form of a monocular HMD 172. The HMD 172 may include side-arms 173, a center frame support 174, and a bridge portion with nosepiece 175. In the example shown in FIG. 2, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD.

Additionally, component housing 176 can include additional input structures, such as a button 167 (shown in FIG. 3) that can provide additional functionality for HMD 172, including implementing a lock or sleep feature or allowing a user to toggle the power for HMD 172 between on and off states. The button 167 can further include an LED light beneath a surface thereof that can indicate a status of the device, such as on or off, or asleep or awake. The button can be configured such that the light is visible when on, but that the source of the light cannot be seen when the light is off.

The HMD 172 may include a single display 180, which may be coupled to one of the side-arms 173A via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

As shown in FIGS. 2 and 3, an end of one of the side arms 173A can be enlarged in the form of an auxiliary housing 177 that can house circuitry and/or a power supply (e.g., removable or rechargeable battery) for HMD 172. In an example, auxiliary housing 177 can be configured and positioned to provide a balancing weight to that of component housing 176. The components within auxiliary housing 177, such as a battery or various control circuitry can be arranged to contribute to a desired weight distribution for HMD 172. HMD 172 can also include a BCT 186 (FIG. 3) positioned on an inner surface of auxiliary housing 177 such that BCT 186 contacts the head of a wearer of HMD 172.

It is also noted that, although the embodiment of FIGS. 2 and 3 shows a component housing 176 that is positioned on side arm 173A such that it is positioned over the right eye of a user when being worn, other similar embodiments are possible in which a mirror-image of component housing 176 can be attached on an opposite side arm 173B to make it positionable over the left eye of the user. Depending on the application of HMD 172 or individual user preferences, it may be desirable to position component housing 176 on a particular side of the user's head. For example, a right-handed person may prefer having the component housing 176 on the right side of her head to make interaction with touch-based input 126 easier. In another example, a person may prefer to have the display 180 over a dominant eye for easier interaction with elements presented on display 180 or over a non-dominant eye to make it easier to shift his focus away from elements presented on display 180 when engaged in other activities.

Figure 4:
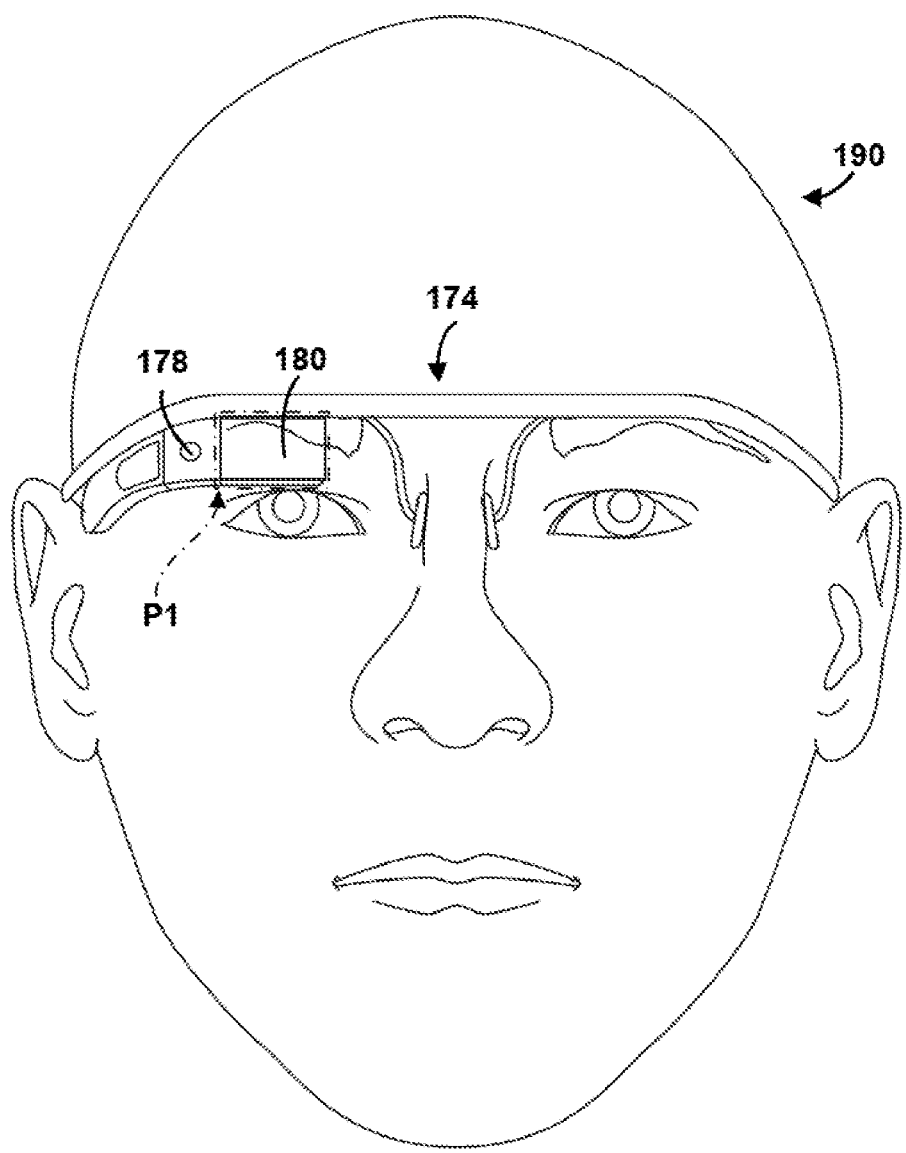
FIG. 4 illustrates a front elevation view of the device of FIG. 2 being worn by a user.
Figure 5:
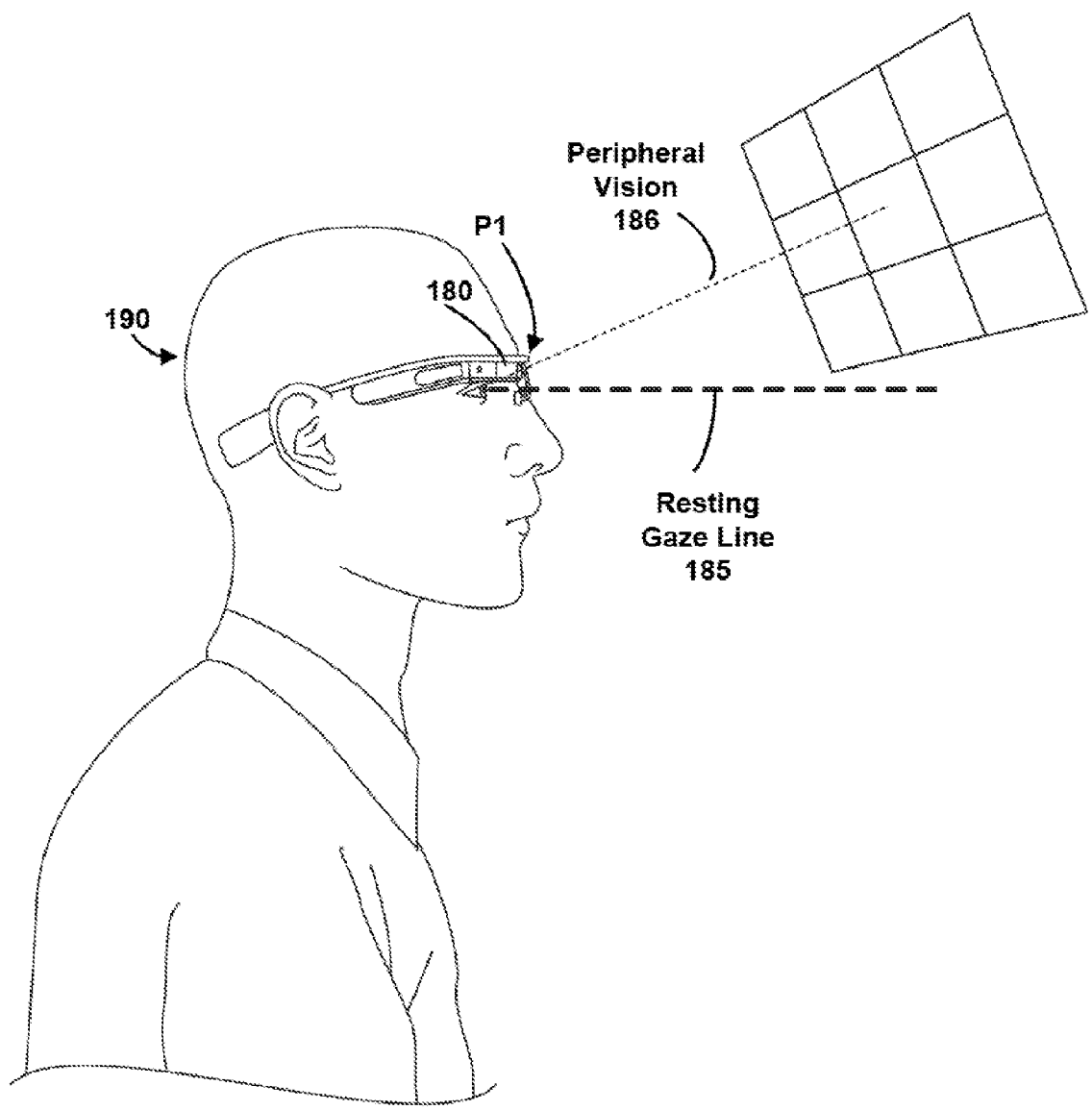
FIGS. 5-6 illustrates the user's gaze lines from a side elevation view.
Figure 6:
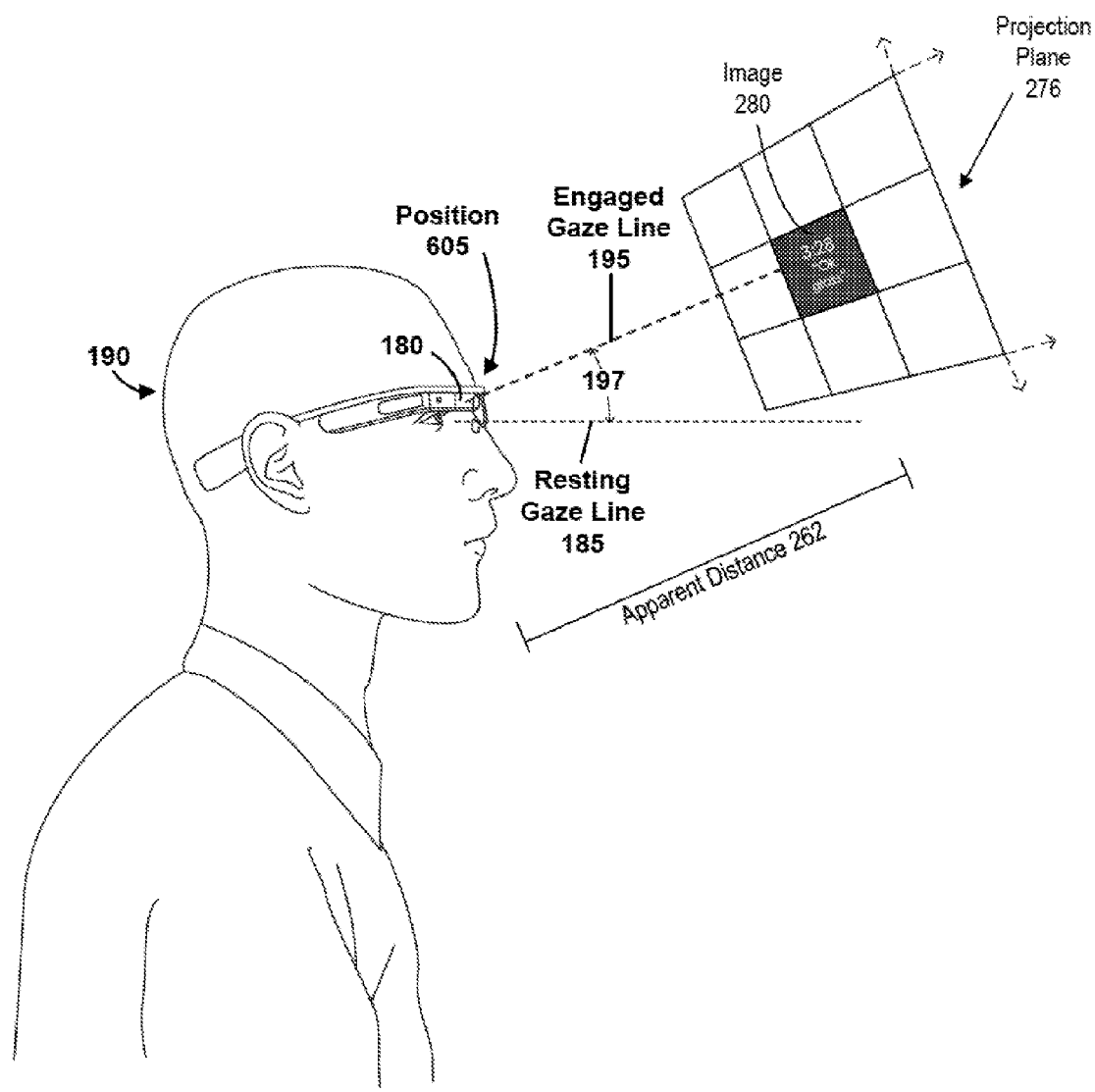

FIGS. 4-6 illustrate HMD 172, as shown in FIGS. 2 and 3 in an example position while being worn on the head of wearer 190. As shown in FIG. 4, HMD 172 may be arranged such that when HMD 172 is worn by wearer 190, display 180 is positioned within a general area that is in front of or proximate to the user's eye. As shown in FIGS. 4-6, HMD 172 can be configured such that display 180 is in position P1 when worn by user 190. Position P1 is such that display 180 is directly below the center frame support and may be horizontally and vertically offset from the center of the wearer's eye (e.g., so that the center of display 180 is positioned to the right (or outside) and above of the center of the wearer's eye, from the wearer's perspective). HMD 172, as shown in FIGS. 2 and 3, shows display 180 and component housing 176 in a relationship to band 182 such that display 180 can be located in position P1 when placed on the head of user 190. In a further example, nosebridge 175 can be adjustable such that positioning of display in position P1 can be achieved among users with different head sizes, nose sizes, eye positioning, or the like. It is further noted that the precise location of position P1 can vary and that position P1 as depicted in FIGS. 4-6 is exemplary. As discussed herein, position P1 can refer to a default or rest position of display 180 relative to the user's eye when HMD 172 is being worn by user 190 and can be such that display 180 is offset from the center of the user's eye or as otherwise described herein.

FIG. 5 further illustrates the above-described configuration of HMD 172, wherein display 180 is in position P1 so as to be outside of the central portion of the wearer's field of view when the eye adjacent display 180 is facing, or looking, forward along resting gaze line 185. The resting gaze line 185 represents the center of the user's field of vision, or the user's line of sight when the user's eyes are looking straight ahead relative to the user's head and/or face. The direction in which the user's eyes are looking or facing can be determined, for example, based on the positioning of the pupil relative to any one of the face, the eye opening, or the brow. When looking straight ahead the eye may be at an ocular resting position, which is a rotational position wherein the ocular muscles are subject to the relative least amount of tension. The positioning of display 180 in P1 can facilitate unobstructed eye-to-eye conversations with others and can also generally provide unobstructed viewing and perception of the world within the central portion of the wearer's field of view, both when the eyes are at rest such that the center of the wearer's field of vision is along gaze line 185, and during rotation of the eyes away from position P1. When the user's eyes are in or near the resting position the user may still be able to view the display however it may only be in the user's peripheral vision. This arrangement may be such that changes in the image presented on display, such as the presentation of specific visual indicators (such as flashing message notifications), for example, are perceptible to the user without such images, or the display in general, blocking the user's view of his surroundings.

As shown in FIG. 6, when display 180 is in position P1 wearer 190 may view image 280 presented by display 180 by looking up with her eyes toward display 180. The location of display 180 will affect how much the wearer must rotate the eyes to align with display 180. When the user rotates his eyes to align with the display, the actual gaze line of the wearer moves away from resting gaze line 185 toward alignment with an engaged gaze line 195. Depending on the exact position P1 of display 180, engaged gaze line 195 may be angled upward, downward, and/or to the side of resting gaze line 185. For example, as shown in FIG. 6 engaged gaze line 195 and resting gaze line 185 intersect near the eye to produce angle 197. Angle 197 may be about 45° (+/−1%) in either or both of the horizontal and vertical directions or it can be from 5° to 85°.

As further shown in FIG. 6, HMD 172 may have display 180 configured to project image 280 for view by wearer 190 at some apparent distance 262. Apparent distance 262 may be, for example, 1 meter, four feet, infinity, or some other distance. That is, HMD 172 can generate image 280 on display 180 which appears to the wearer to be in projection plane 276 at apparent distance 262 from the eye of wearer 190. In one example, the display element of HMD 172 and image 280 may be transparent or semi-transparent so wearer 190 can perceive objects in the real world that are closer or farther then apparent distance 262 even though the object and image are along the same gaze line 195. The result of such an arrangement is that the user is effectively looking through display 180 to image 280 along gaze line 195. Accordingly, in order to view an image being displayed a user may also have to adjust the focal distance of the eye to a distance far greater than the distance of the display itself.

It is noted that in connection with HMD 172 as described herein including display 180, there may be no one single gaze line 195 along which a user's eyes are directed to view image 280. Rather, the user's eyes can be said to be along engaged gaze line 295 in any position wherein the center of the user's line of sight is aligned with image 280 and/or passes through display 180. Accordingly, engaged gaze line 295 may be within a range of angles with respect to resting gaze line 185, for example between 10° and 70° in the vertical direction. In another example, engaged gaze line 295 may be within a range of angles with respect to resting gaze line 185 of between 20° and 30° in the horizontal direction.

As stated above, when the user is looking straight ahead the eye may be at an ocular resting position and aligned with resting gaze line 185. In general, for many users, eye positions relatively closer to the ocular resting position are easier to sustain over extended periods of time than positions relatively farther from the ocular resting position because, as stated above, such positions involve relatively lower and/or more balanced tension within the ocular muscles. The larger the angular change between the gaze lines the more the eye will rotate which increases the tension on the eye and may result in quicker eye fatigue or eyestrain.

The human eye has several different groups of muscles that are each responsible for controlling different movements. One group of muscles is the extraocular muscles, which control the rotation of the eyes. There are four extraocular muscles used to adjust the location of the eye, each rotates the eye in one of four directions, left, right, up, and down. These muscles are typically under the least amount of tension in an ocular resting position. The ocular resting position is defined as the position in which the user is looking straight ahead in relation to the head. When the eye is looking in direction other than straight ahead, there is increased tension on the extraocular muscle responsible for rotating the eye in the specified direction. This existence of increased tension on the extraocular muscles often accelerates eye fatigue and may result in eyestrain.

Figure 7:
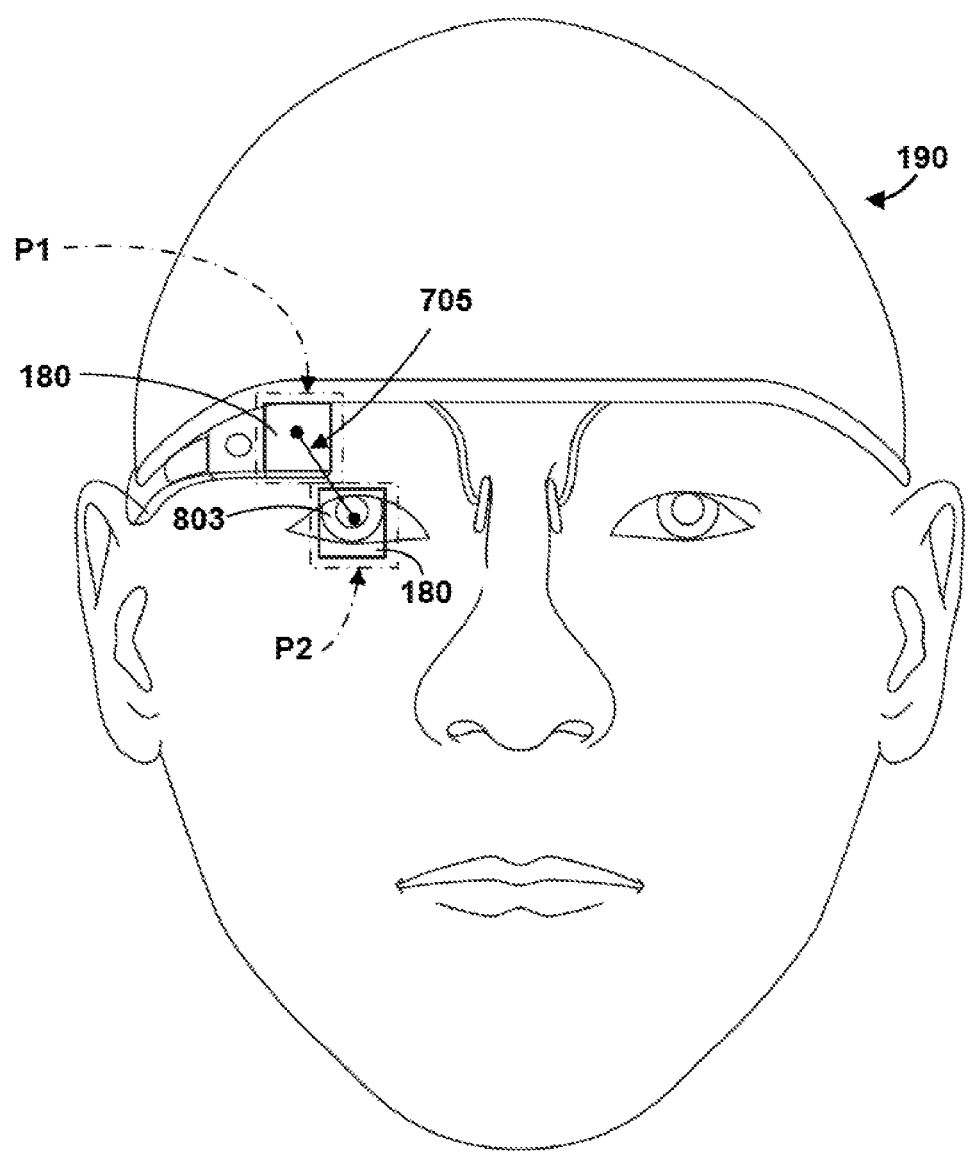
FIG. 7 shows the device of FIG. 2 in an adjusted configuration thereof.

As shown in FIG. 7 HMD 172 may be configured to move display 180 to a position other than P1, as shown in FIGS. 4-6, without adjustment or repositioning of HMD 172 on the wearer's head. Such movement can be driven by a mechanism included in HMD 172 and can be done automatically, upon a determination by the internal circuitry of HMD 172, or can be done upon receiving an input from the user. In an example, HMD 172 can be configured to move display 180 from P1 to a position that may reduce eyestrain or have other effects on, for example, the visibility of image 280 or the comfort of the wearer. For example the HMD may have a positioning mechanism that can adjust the location of display 180 between position P1, which can be the original position or a default position and an adjusted position P2, which can be an engaged position or ocular resting position. This may be performed by moving display 180 along path 705. In an example, both positions P1 and P2 are such that the user can view image 280, however when the display is in adjusted position P2 display 180 may be closer to resting gaze line 185 of eye 803 such that image 280 is viewable with eye 803 closer to or at its ocular resting position. The adjusted position P2 may be directly in front of eye 803 or it may be slightly offset allowing for image 280 to be viewed with only minimal rotation of eye 803.

The HMD may be configured to automatically move display 180 when it detects the user is engaging the display. Engagement may be detected, for example, based on a determination that the user is viewing content being displayed by HMD 172 for a predetermined period of time. Such a determination may be made, for example, by eye-tracking unit 121 included on HMD 172. Eye tracking unit 121, as shown in FIG. 3, may include one or more inward-facing image capture devices and/or one or more other inward-facing sensors. The inward-facing capture device may be a camera that is configured to capture still images or video of the wearer's eyes. In another example, eye tracking unit 121 may be positioned to view only a single eye that is adjacent to or associated with display 180. Eye tracking unit 121 may be configured to detect or infer an instantaneous eye orientation of one or both of the wearer's eyes. The instantaneous eye orientation is the orientation of the eye at a predetermined moment in time or over a predetermined duration of time. The instantaneous eye orientation may be captured by the camera at regular intervals based on a control loop implemented by the processor, for example. The camera may be configured to communicate the image to the processor, which can infer or calculate the orientation and/or position of the user's instantaneous gaze line based on the image. In an alternative arrangement, eye tracking unit 121 can itself infer or calculate the instantaneous eye position and/or gaze line and communicate such information to the processor.

In an example, the gaze line can be inferred based on the positioning of portions of the eye within the field of view of eye tracking unit 121. In this example, the processor can identify the pupil of eye adjacent to display 180 and can determine the position thereof based on a comparison of known locations within the field of view of eye tracking unit 121. For example, the processor may contain such information about the field of view of eye tracking unit 121, such as the position thereof relative to display 180. As shown in FIG. 3, eye tracking unit 121 may be positioned on component housing 172 adjacent display 180 such that when the eye is near the resting position (i.e. when the instantaneous gaze line is aligned with resting gaze line 185), the pupil may be positioned toward an edge of the field of view or away from the center thereof. When the wearer directs his eye toward display 180, the pupil may move toward the center of the field of view of eye tracking unit 121, which can be recognized by the processor. In another example, the processor can calculate the gaze line of the wearer based on the perceived geometry of the eye based on the image received from eye tracking unit 121. This can include, for example, the shape of the iris (e.g. more elliptical when looking away from display 180 or more circular when looking toward display 180). Other examples can include the analysis of characteristics of the eye itself, such as the location of the focal point of the eye based on analysis of the shape of the lens, and can be facilitated by configuring eye tracking unit 121 to capture high-resolution images of the eye.

The processor, which can have access to information regarding the instantaneous position of the display (such as by being configured to control the display position), can be configured to compare the instantaneous eye orientation or instantaneous gaze line with the instantaneous display position. The instantaneous display position is the position of the display at a moment in time or over a duration of time that can correspond to the same moment or duration as that of the instantaneous eye position, with a slight difference permitted due to the timing of the execution of relevant commands in a system. The display position, similar to the eye orientation, may be captured at regular intervals based on a control loop, for example. If the processor determines, based on either an inferred or calculated eye position that the eye or instantaneous gaze line of the eye is aligned with a portion the instantaneous display position, the processor may infer that the user is currently engaging the display. In the example discussed above, wherein the eye position and/or instantaneous gaze line is inferred based on the position of the pupil (for example) within the field of view of eye tracking unit 121, the processor can determine that the user is looking at the display based on the pupil being within a location that the processor has associated with the display position. In another example, the processor may also take into account the accommodation of the eye to determine the eye's current focal depth (i.e., how far out the eye is focused) and compare it to the perceived distance of the image. If they are the same or substantially similar distances it may infer that the user is currently engaging the display. If they are not then the processor may infer the user is looking at something before or after the image.

Once the processor determines that the user is engaging display 180 it may instantaneously begin moving display 180 along path 705 toward adjusted position P2. Alternatively, the processor may delay movement of display 180 for a predetermined threshold period of time, which may be a fraction of a second or up to two minutes. In one embodiment, it may be between 1 and 5 seconds. As shown in FIGS. 4-7, the default position P1 of display 180 may be such that the user can comfortably view image 280 for a period of time with relative comfort. This time may be between 1 and 5 seconds or up to 30 seconds. Further HMD 172 itself may be configured to carry out operations or present information to the wearer such that short periods of engagement with display 180 are sufficient through use of HMD 172 in many situations. Accordingly, display 180 can be maintained in position P1 for a period of time, such as up to about 10 seconds, to keep display 180 positioned to facilitate such quick interactions without moving into the center of the wearer's field of vision. HMD 172 may, in some situations (such as at the request of the user), present information that the user can remain engaged with over an extended period of time (e.g. more than 10 seconds) during which looking at the display in position P1 can become uncomfortable. For situations such as this it may be beneficial to move display 180 toward and into adjusted position P2 and such movement can begin after a threshold time, as discussed above.

The duration of the delay may also be dynamically adjusted based on any of the following, 1) the type of data being displayed, 2) historical use and/or 3) current environmental facts. For example, if the user is currently viewing a text message while jogging the processor may determine that there is no need to reposition the display because based on historical use the interaction typically takes place over a short duration and there is no need to move the display to reduce eyestrain. However if the user is reading a book or viewing an article on a web page while not moving in a low lit area (e.g. bedroom) the processor may infer that the user will continue to read for an extended amount of time and thus it will reposition display 180 to a better viewing position to help reduce eyestrain.

The speed at which the display is moved may depend on whether the display is moving toward the adjusted position P2 or away from it. When display 180 is travelling toward adjusted position P2, it may travel slow enough that the movement is imperceptible to the user or is otherwise not disruptive to the user's ability to view or read the information presented on display 180. Imperceptible does not necessarily mean the user cannot tell that the display was moved, but rather that is the movement can be configured to be subtle or not jarring to the user and such that the user can continue to view the image/read text within the image without conscious effort to track the display with the adjacent eye. Depending on the sensitivity of the user and/or the level of attention being paid to the image 290 or its contents, as well as the speed and path 705 of the movement of display 180, individual users may actually not be able to perceive the movement in some instances because the movement is so slow. While the display moves either toward or away from position P2 it may remain at a constant speed or a constant acceleration. Alternatively, the speed or acceleration may vary, for example, there can be a constant acceleration until display 180 reaches the half-way point of path 175 at which point display 180 steadily decelerates until it arrives at position P2.

When the display is travelling away from the ocular resting position, e.g., toward position P1, there may be a different objective, for example it may not be important that the movement be imperceptible but rather that the display rapidly move out of the user's line of sight. In this case the speed may be several times faster than the speed at which the display moves toward position P2, for example, the ratio between the speed away from the ocular resting position and the speed toward the ocular resting position may range from 10:1 to 1000:1.

Figure 8:
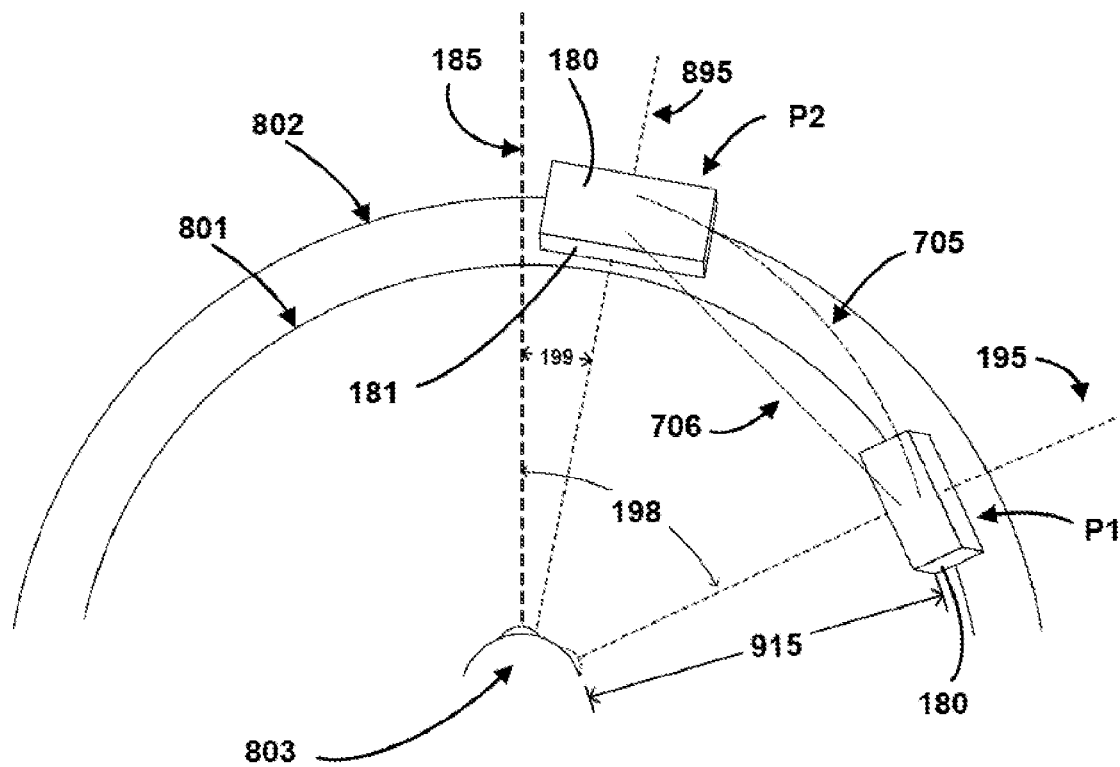
FIG. 8 illustrates a top down view of the multiple display positions.
Figure 9:
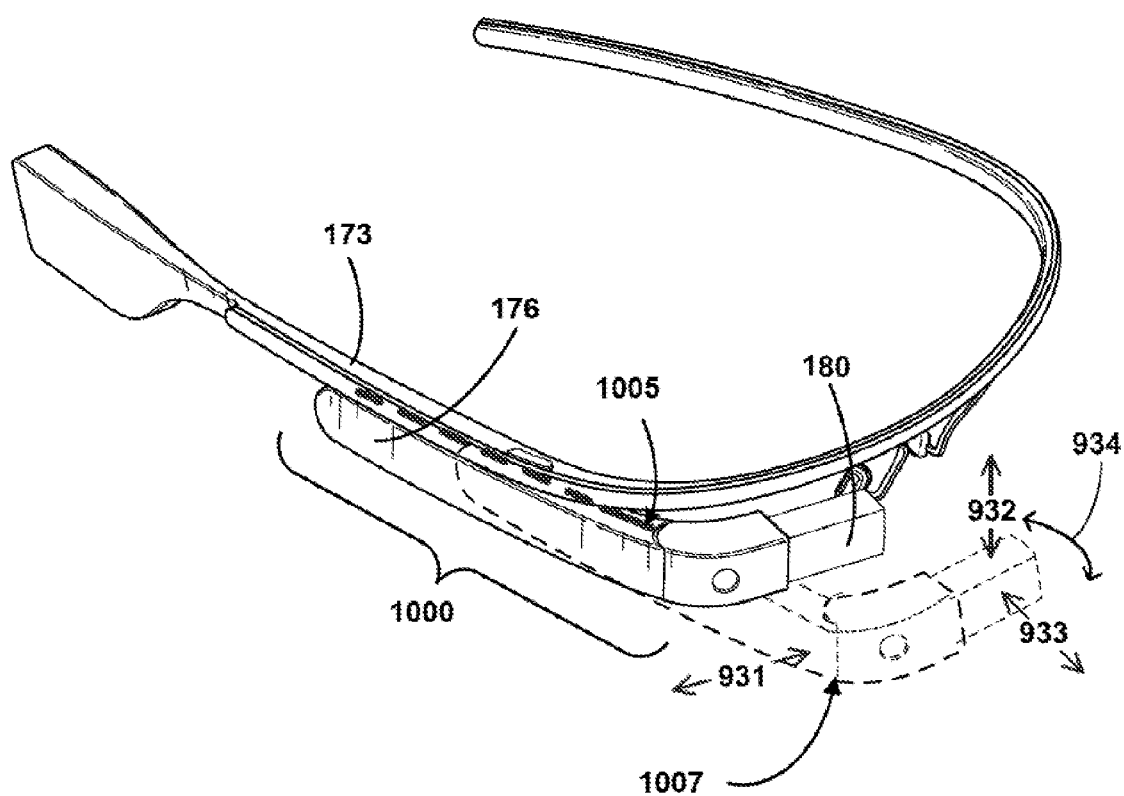
FIG. 9 illustrates the device of FIG. 2 with a positioning mechanism.

FIG. 8 is a top-down schematic view depicting display 180 in examples of default position P1 and adjusted position P2 as well as the corresponding orientation of the adjacent one of the user's eyes when aligned with display 180 in the various positions P1 and P2. As shown in FIG. 8 semi-spherical plane, represented by latitude lines 801 and 802 may comprise a plurality of points each representing a potential position of display 180. For example, positions P1 and P2, shown in FIG. 7, may lie on the semi-spherical plane, along latitude lines 801 and 802, respectively. Engaged gaze line 195 represents the wearer's line of sight when looking at display 180 while in position P1. As seen in this figure, engaged gaze line 195 is horizontally offset from resting gaze line 185 at angle 198. Angle 198 may be about 55° (+/−1%) or it can be between 5° to 85°. As seen in FIG. 6 the engaged gaze line can also be vertically offset 45°. Other positions for P1 having different offsets are also possible, the positions in FIG. 8 being used for illustrative purposes only. As a result, user's eye 803 can rotate 55° to the right and 45° up from its ocular resting position to view display 180 when it is in position P1. This rotation when sustained for extended periods may, as discussed above, result in eyestrain or other discomfort. In comparison, when display 180 is in adjusted position P2, it intersects engaged gaze line 895. Gaze line 895 may be much closer to resting gaze line 185 and thus may require less rotation of the eye and result in less eyestrain and more comfortable long-term viewing. As shown in FIG. 8, gaze line 895 may be offset from resting gaze line 185 by angle 199. Angle 199 can be up to 55° in either or both of the horizontal and vertical directions, for example it may only be 5° and thus only require a 5° rotation of the user's eye in either or both of the horizontal and vertical directions. In such an example, because the location of position P2 is relative to the user's eye, such a location may vary among users and can be determined based on preset information (such as by the user) or by a determination of the processor. Such a variation can, for example be due to varying interpupilary distances among wearers.

As the display moves between positions, it may remain at a constant distance from the user's eye. As shown in FIG. 8, each point on the semi-spherical plane, and thus each position of the display 180 (including positions P1 and P2), may be the same distance from the user's eye 803. In one embodiment, display 180 may travel between positions along arc path 705. Arc path 705 may be along the surface of semi-spherical plane 801 such that the distance remains constant at display distance 915. Keeping display 180 at a constant distance as it moves between the positions may reduce the amount of ocular re-focusing necessary and may reduce eyestrain and/or any perception of the movement toward P2 or other interference with the user's ability to view image 280 during display movement. Further, the movement of display 180 can be configured such that the display remains at a constant rotational position relative to the eye. In an example, surface 181 of display 180 can remain perpendicular to a vector between surface 181 and the focal center of the adjacent eye. Such movement can maintain the visibility of image 280 during movement of display 180, particularly in examples of HMD 172 wherein image 280 is projected into the user's eye using display 180.

In another example, display 180 and/or projected image 280 may have a distance from the eye that changes while it moves between positions, and thus does not remain constant. Although the display/image may still be moving along the plane, the plane may accordingly include points, which have different distances from the eye. In this example, the plane may resemble an ellipsoid. The varying distance of the ellipsoid from the eye may be based on the location of a given point thereon in relation to the location of the eye, for example a point where the gaze line intersects the semi-spherical plane may be closer or farther than a point where the fovea region or the outer periphery region intersects the semi-spherical plane.

Distance 915 may be the distance between a point near the eye and a point near the display (or projected image). The point near the eye may be the center of the eye, the back of the eye, or the outermost surface of the eye (e.g. cornea). The point near the display may be the center of the display, the outer surface of the display, the beam splitter within the display, or the perceived distance of the projected image. The optimum value for the distance may be based on the eye's optimum focal distance, the interpupiliary distance, or some combination. For example, the optimum value for the display distance may be less than 2 inches and the optimum value for the projected image may be between 3-8 feet.

The path taken when moving display 180 toward position P2 may be the same or different than the path taken when returning the display to the original position P1. In one embodiment, the trajectory of the display from position P1 to position P2 as well as the return trajectory from position P2 to P1 may both be along path 705 or alternatively along separate but similar paths. In another example, only the path toward position P1 is along arc path 705 and the return path can be different, for example, the return path may be along a straight-line as seen by straight path 706. An advantage of a straight-line path is that it may be shorter than an arced path and thus the display may move between positions faster. Alternatively, the return path may include travel in more than one direction at a time, for example by traveling along each of the x, y, and/or z axes, or rotate along a horizontal angle and then along the vertical angle and/or adjusting the depth.

As mentioned above, HMD 172 may include positioning mechanism 1000 configured to automatically move display 180 relative to band 182 without user contact therewith or manipulation thereof. The positioning mechanism may lie between band 182 (or other mount structure for securing display 180 to the head of the wearer) and display 180 and may include one or more actuators interconnected via gears, pulleys, or fluid to one or more rails, hinges, or ball joints. The actuators may incorporate thermal, magnetic, elastic, electrostatic, and/or piezoelectric mechanisms. As seen in FIG. 11, the positioning mechanism may include a rail 1005 and hinge 1007. Rail 1005 can be positioned between the lower surface of side-arm 173 and the upper surface of component housing 176. Rail 1005 may further be configured to pivot or extend the display inward and outward along x-axis 931, y-axis 932, and z-axis 933 in order to adjust the location of the display 180. The hinge assembly 1007 may be configured to pivot about an axis in direction 934 to adjust the height, rotation and/or angle of display 180 (e.g., the yaw and/or pitch thereof).

Figure 10:
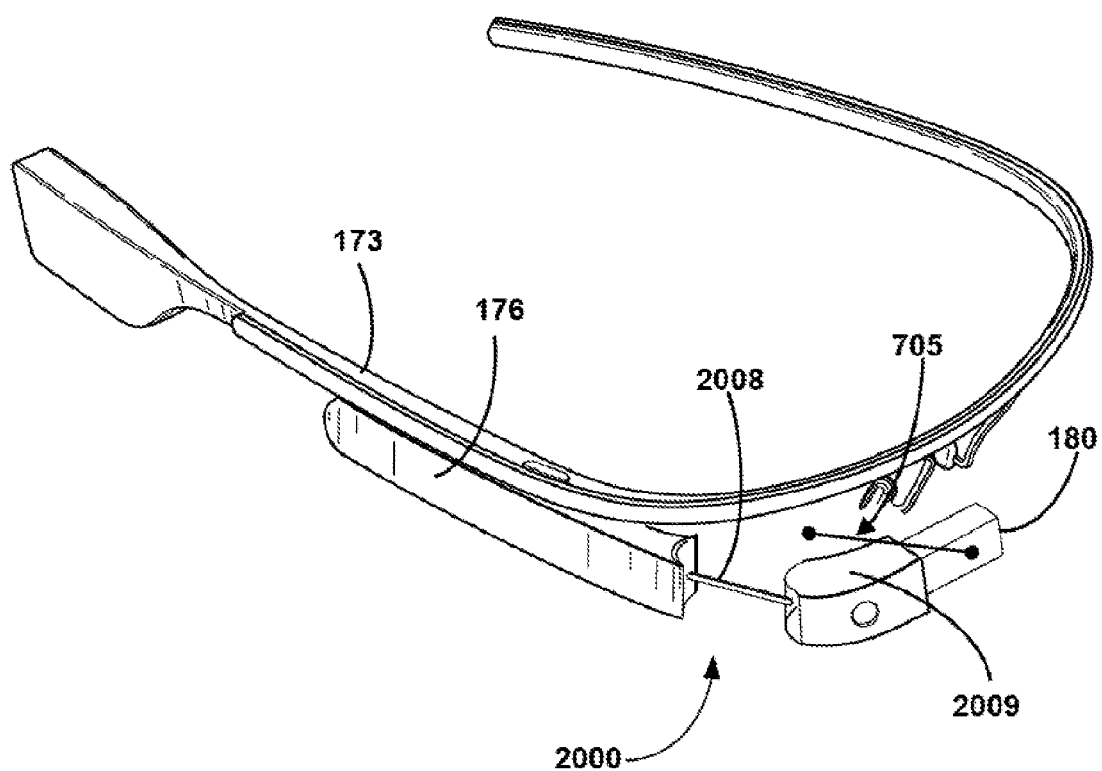
FIG. 10 illustrates the device of FIG. 2 with an alternate positioning mechanism.

As shown in FIG. 10, positioning mechanism 2000 may also include extension arm 2008 attached between component housing 176 and display unit 2009. Extension arm 2008 may be configured to extend in and out of component housing 176 by an actuator or other structure therein, for example, to move display 180 along path 705. Arm 2008 can itself be arced such that by extension of arm 2008 out of component housing 176, alone, display 180 is moved along path 705 in a predetermined manner. Alternatively, or additionally, arm 2008 can be hinged with respect to display housing 2009 and/or with respect to component housing 176. Such an arrangement can allow for positional adjustment of display 180 along path 705 or a variation thereof that can be determined by the processor of HMD 172, set by the user, or a combination thereof. A hinged arrangement can also allow for the use of a straight arm 2008 that can be moved along the one or more hinges to achieve the desired movement of display 180. Still other variations of positioning mechanisms are possible that incorporate various features in various combinations thereof from the above-described mechanisms. Such mechanisms or variations thereof can also be adapted for incorporation into other head-mountable display devices, such as those described elsewhere herein.

Although the description herein has been made with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A head mountable display device comprising:
   a display unit including a display, the display unit being configured to present information to a user via the display;
   a mount coupled to the display unit, the mount configured to be worn on the head of the user with the display positionable adjacent to an eye of the user;
   a positioning mechanism attached between the mount and the display, the positioning mechanism being configured to move the display relative to the mount;
   an eye tracking unit configured to obtain an image of the eye to which the display is adjacent; and
   a processor in communication with the eye tracking unit and the positioning mechanism, the processor being configured to:
      cause the positioning mechanism to move the display toward an engaged viewing position during a period when an instantaneous eye orientation is aligned with an instantaneous display position; and
      cause the positioning mechanism to move the display toward an original viewing position during a period when the instantaneous eye orientation is not aligned with the instantaneous display position.

2. The device of claim 1, wherein the engaged viewing position of the display is a position where an ocular resting gaze line intersects a portion of the display.

3. The device of claim 1, wherein the original viewing position of the display is a position where the display is in a periphery of the user's field of vision when the instantaneous eye orientation is aligned with an ocular resting gaze line.

4. The device of claim 1, wherein the processor is further configured to:
   determine the instantaneous display position from data obtained from the positioning mechanism;
   determine the instantaneous eye orientation from data obtained from the eye tracking unit;
   compare the instantaneous position of the display and the instantaneous eye orientation to determine whether the instantaneous eye orientation is aligned with the instantaneous display position; and
   cause the positioning mechanism to move the display toward the engaged viewing position after a determination that the instantaneous eye orientation has been aligned with the instantaneous display position for a predetermined period of time.

5. The device of claim 4, wherein the predetermined period of time is greater than a threshold period of time.

6. The device of claim 1, wherein the processor causes the positioning mechanism to move the display toward the engaged viewing position at a first average speed, and wherein the processor causes the positioning mechanism to move the display toward the original viewing position at a second average speed that is greater than the first average speed.

7. The device of claim 6, wherein a ratio of the second average speed to the first average speed is at least 10:1.

8. The device of claim 1, wherein the processor causes the positioning mechanism to move the display toward the engaged viewing position by movement that is configured to be imperceptible to the user.

9. The device of claim 1, wherein the positioning mechanism is configured to move the display along a semi-spherical plane, the semi-spherical plane having a center positionable near a focal center of the eye of the user.

10. The device of claim 1, wherein the positioning mechanism is configured to move the display along a plurality of axes.

11. The device of claim 1, wherein the positioning mechanism is configured to move the display by causing rotation of the display about an axis.

12. The device of claim 1, wherein determining the instantaneous eye orientation includes inferring a gaze line of the eye, and wherein a determination that the instantaneous eye orientation is aligned with the instantaneous display position includes a determination that the inferred gaze line intersects a portion of the image being displayed.

13. The device of claim 1, wherein the mount comprises:
   a center support extending in generally lateral directions;
   a first side arm extending from a first end of the center support;
   a second side arm extending from a second end of the center support; and
   an extension arm configured to present the information to the user via the display, the extension arm extending at least partially along the first side arm on a first side of the center support and further extending from the first side arm to a display end that supports the display in a position on a second side of the center support.

14. A head mountable display device comprising:
   a mount structure including a center support extending in generally lateral directions, a first side arm extending from a first end of the center support, and an extension arm configured to present the information to the user via the display, the extension arm extending at least partially along the first side arm on a first side of the center support and further extending from the first side arm; with the display;
   a display unit affixed on the side arm and positionable adjacent an eye of the user when the mount structure is worn on the head of a user, the display unit including a display configured to present information to a user via the display;
   an eye tracking unit configured to obtain an image of the eye to which the display is adjacent; and
   a positioning mechanism attached between the mount and the display, the positioning mechanism being configured to move the display relative to the mount such that the display moves toward an engaged viewing position during a period when an instantaneous eye orientation is aligned with an instantaneous display position, and moves the display toward an original viewing position during a period when the instantaneous eye orientation is not aligned with the instantaneous display position.

15. The device of claim 14, wherein the positioning mechanism includes at least one rail.

16. The device of claim 14, wherein the positioning mechanism is configured to translate the display unit relative to the extension arm.

17. The device of claim 14, wherein the positioning mechanism is configured to rotate the extension arm relative to the mounting structure and to rotate the display unit relative to the extension arm.

18. The device of claim 14, wherein the positioning mechanism is configured to translate the extension arm relative to the mounting structure.

19. The device of claim 14, further comprising a processor in communication with the eye tracking unit and the positioning mechanism, the processor being configured to:
- determine the instantaneous display position from data obtained from the positioning mechanism;
- determine an the instantaneous eye orientation from data obtained from the eye tracking unit;
- compare the instantaneous display position and the instantaneous eye orientation to determine whether the instantaneous eye orientation is aligned with the instantaneous display position;
- cause the positioning mechanism to move the display toward the engaged viewing position during the period when the instantaneous eye orientation is aligned with the instantaneous display position; and
- cause the positioning mechanism to move the display toward an original viewing position during a period when the instantaneous eye orientation is not aligned with the instantaneous display position.

20. A method of positioning a display of a head mountable device, the method comprising:
- determining an instantaneous position of a display from data obtained from a positioning mechanism attached between the display and a mount, the mount configured to secure the display to a head of a user and adjacent an eye of the user;
- determining an instantaneous eye orientation from data received from an eye tracking unit directed at the eye;
- comparing the instantaneous position of the display and the instantaneous eye orientation to determine if the instantaneous eye orientation is aligned with the instantaneous display position;
- instructing the positioning mechanism to move the display toward an engaged viewing position during a period when the instantaneous eye orientation is aligned with the instantaneous display position; and
- instructing the positioning mechanism to move the display toward an original viewing position during a period when the instantaneous eye orientation is not aligned with the instantaneous display position.

21. The method of claim 20, wherein instructing the positioning mechanism to move the display toward the engaged viewing position is performed after a determination that the instantaneous eye orientation has been aligned with the instantaneous display position for a predetermined period of time.

22. The method of claim 20, wherein the movement of the display toward the engaged viewing position is performed at a first average speed, and wherein movement of the display toward the original viewing position is performed at a second average speed that is greater than the first average speed.

23. The method of claim 20, wherein the movement of the display toward the engaged viewing position is imperceptible to the user.

* * * * *